(12) United States Patent
Piorkowski et al.

(10) Patent No.: US 6,733,049 B2
(45) Date of Patent: May 11, 2004

(54) APPARATUS AND METHODS FOR LATCHING AN AIRCRAFT DOOR

(75) Inventors: Mitchell J. Piorkowski, Mill Creek, WA (US); Richard LaConte, Black Diamond, WA (US); Larry C. Smith, Sumner, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/210,946

(22) Filed: Aug. 2, 2002

(65) Prior Publication Data

US 2003/0090113 A1 May 15, 2003

Related U.S. Application Data

(60) Provisional application No. 60/393,594, filed on Jul. 3, 2002.

(51) Int. Cl.$^7$ ................................................. E05C 1/06
(52) U.S. Cl. ........................ 292/139; 292/163; 292/165; 292/DIG. 73
(58) Field of Search ................................ 292/163, 169, 292/165, 170, 137, 164, DIG. 73

(56) References Cited

U.S. PATENT DOCUMENTS

| | | | | |
|---|---|---|---|---|
| 667,297 A | * | 2/1901 | Crawford ...................... 70/150 |
| 910,709 A | * | 1/1909 | Mulrooney ..................... 292/8 |
| 1,486,998 A | * | 3/1924 | Wiley ....................... 292/169.11 |
| 1,663,245 A | * | 3/1928 | Devereaux ................... 292/173 |
| 1,752,559 A | * | 4/1930 | Hurd ............................ 292/169 |
| 2,476,520 A | * | 7/1949 | Waitekaites .................. 70/150 |
| 3,770,306 A | * | 11/1973 | Nystrom ..................... 292/169 |
| 4,429,909 A | * | 2/1984 | Lindquist .................... 292/92 |
| 4,688,695 A | * | 8/1987 | Hirohata ..................... 49/364 |
| 4,773,242 A | * | 9/1988 | Smith ........................ 70/455 |
| 4,872,716 A | * | 10/1989 | Legrand et al. .......... 292/336.3 |
| 4,982,986 A | * | 1/1991 | Gressett et al. .......... 292/336.3 |
| 5,035,455 A | | 7/1991 | Kurosaki ............... 292/341.17 |
| 5,067,757 A | * | 11/1991 | Cohrs et al. ............. 292/336.3 |
| 5,092,642 A | | 3/1992 | Lindmayer et al. ...... 292/336.3 |
| 5,247,817 A | * | 9/1993 | Korner et al. ................ 70/240 |
| 5,590,928 A | * | 1/1997 | Voiculescu ................... 292/338 |
| 6,050,620 A | * | 4/2000 | Rogers et al. .............. 292/216 |
| RE36,694 E | | 5/2000 | McFarland ............... 292/336.3 |
| 6,155,615 A | * | 12/2000 | Schultz ........................ 292/163 |
| 6,174,005 B1 | * | 1/2001 | Norton .................. 292/169.21 |
| 6,217,088 B1 | * | 4/2001 | Magnusson ................. 292/165 |
| 6,302,453 B1 | * | 10/2001 | Norton .................. 292/169.21 |
| 6,460,904 B1 | * | 10/2002 | Stapf ....................... 292/336.3 |

OTHER PUBLICATIONS

PCT WO 88/01000, PCT/SE87/00352, Crawford Door Production, Feb. 11, 1988.*

* cited by examiner

Primary Examiner—J. J. Swann
Assistant Examiner—Thomas Ho
(74) Attorney, Agent, or Firm—Harness Dickey & Pierce P.L.C.

(57) ABSTRACT

An intruder-resistant latch useful for latching an aircraft flight deck door includes a damper for reducing noise while the door is being operated. The latch also includes a driver member having coated pins that reduce noise while the latch is in operation. The latch allows a flight deck door to be operated with minimal disturbance to a flight crew at work and/or crew members who may be resting. The latch is fabricated of ballistic impact-resistant material(s).

17 Claims, 4 Drawing Sheets

APPARATUS AND METHODS FOR LATCHING AN AIRCRAFT DOOR

CROSS-REFERENCE TO RELATED APPLICATIONS

This application claims the benefit of U.S. Provisional Application No. 60/393,594, filed Jul. 3, 2002, which is hereby incorporated by reference in its entirety.

FIELD OF THE INVENTION

The present invention relates generally to aircraft door latches and, more particularly, to an intruder-resistant aircraft door latch having a damper for reducing noise while the door is being operated.

BACKGROUND OF THE INVENTION

There is presently a heightened interest to provide for the personal safety of aircraft passengers and flight crews during air travel. Thus it is desirable to configure flight deck doors and door latches on aircraft so as to minimize opportunities for unauthorized persons to enter an aircraft flight deck. In order to meet Federal Aviation Administration (FAA) regulations for commercial aircraft, cockpit doors, including latches and structures surrounding such doors, should be strong enough to withstand ballistic impact and unwanted intruder entry.

Door structures that meet such specifications, however, tend to be heavy and to produce undesirable noise during operation. For example, when such a door is closed, the sound of a latch bolt snapping into place to bolt the door can be sufficiently loud to distract crew members who are operating the aircraft. Such noises also have a tendency to awaken crew members sleeping in nearby crew rest areas. It would be desirable, then, to provide cockpit door latches that are resistant to intruders and ballistic impact but are quiet during operation.

SUMMARY OF THE INVENTION

The present invention, in one preferred embodiment, is directed to an intruder-resistant latch useful for latching an aircraft flight deck door. The latch includes a damper for reducing noise while the door is being operated. The latch also includes a driver member having pins coated, for example, with a urethane coating that reduces noise while the latch is in operation. The latch allows a flight deck door to be operated with minimal disturbance to a flight crew at work and/or crew members who may be resting. The latch is fabricated of ballistic impact-resistant material(s).

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses. Embodiments of the present invention are described herein relative to an aircraft cockpit door. Embodiments are described as having one handle so as to allow such a door to be opened only from inside the cockpit. The invention, however, is not so limited. Embodiments also are contemplated having more than one handle and/or configured for use with openings other than cockpit doors.

Figure 1:
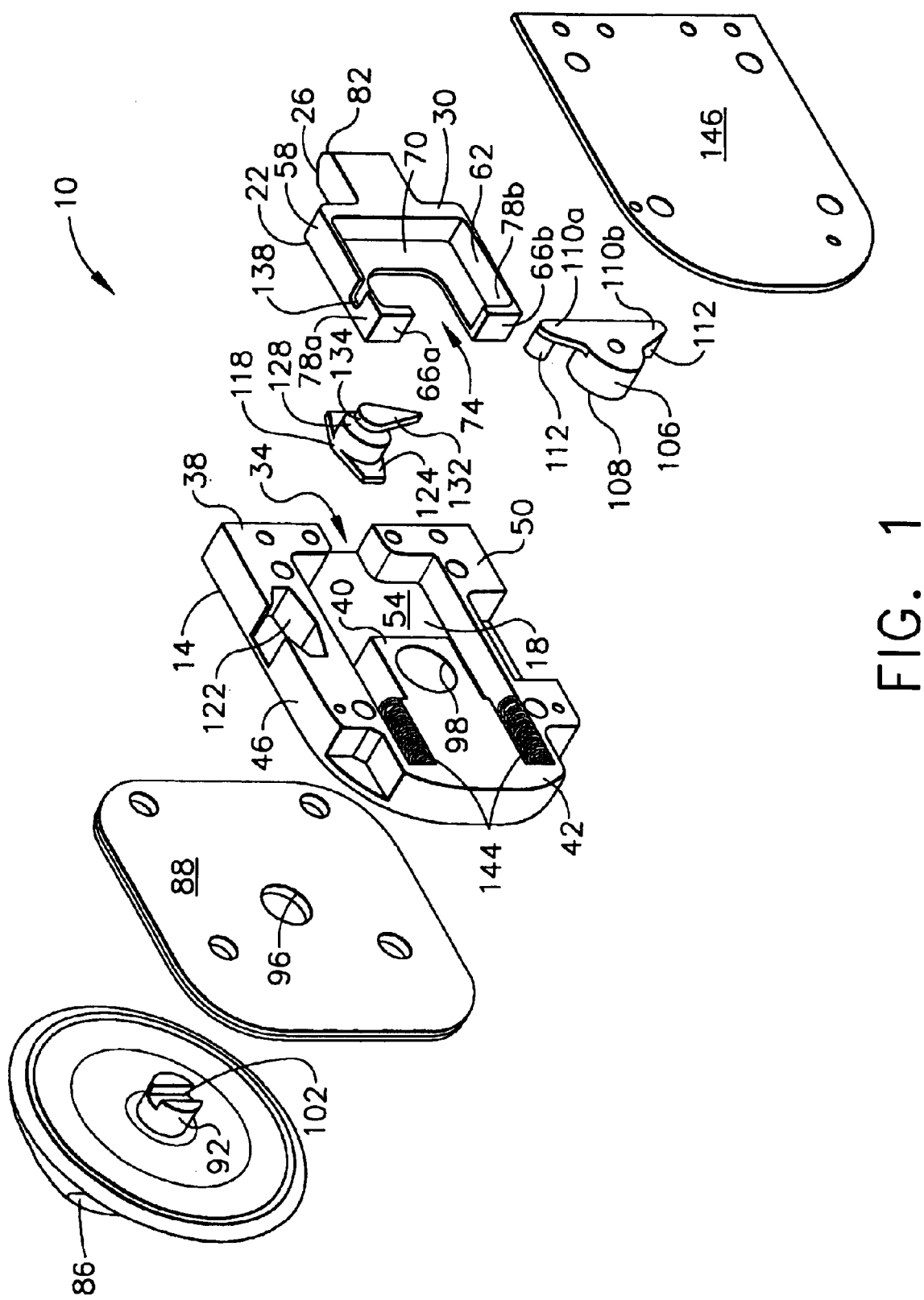
FIG. 1 is an exploded perspective of an embodiment of a door latch according to principles of the present invention.

An embodiment of a door latch useful for latching an aircraft cockpit door is indicated generally by reference number 10 in FIG. 1. The latch 10 includes a latch body 14 having a hollow 18 for accommodating a bolt member 22. The latch body 14 and bolt member 22 are installed together in a recess at an edge of the door (not shown), as is widely known. The bolt member 22 can be moved relative to the latch body 14 and the door as further described below. Movement of the bolt member 22 allows a bolt 26 extending from a proximal wall 30 of the bolt member 22 to be extended through a slot 34 in a proximal wall 38 of the latch body 14 and into a bolt receptacle or strike in the door frame (not shown). The terms "proximal" and "distal" are used herein with reference to a door edge at which the latch 10 is configured to be installed.

The latch body hollow 18 is defined generally by the proximal wall 38, a driver mount 40 extending proximally from a distal wall 42, an upper wall 46, and a lower wall 50 extending from a plate 54. An upper wall 58 and lower wall 62 of the bolt member 22 extend distally from the proximal wall 30 and terminate in a pair of abutments 66a and 66b. A plate 70 extending from the proximal, upper and lower walls 30, 58 and 62 has a slot 74 defined between the abutments 66 for accommodating a driver member as further described below. The upper and lower walls 58 and 62, abutments 66 and slotted plate 70 together form two opposed arms 78a and 78b of the bolt member. The bolt 26 has a beveled tip 82.

A door handle 86 is mounted, for example, on the flight deck side of the door, over a decorative escutcheon plate 88. The handle 86 is fixedly connected to a shaft 92. The shaft 92 extends rotatably through a hole 96 in the escutcheon plate 88, through a partial section (not shown) of the door, and into the driver mount 40 via a hole 98. An end groove 102 of the shaft 92 is fixedly connected to a driver member 106 via a tongue 108. The driver member 106 has a pair of arms 110a and 110b that include a pair of pins 112. The pins are preferably integral to the driver member 106 and padded with a urethane or plastic coating. Other coatings comparably effective for sound dampening may be used. The driver and pins shall be further described below.

A damper member 118 is housed in a recess 122 in the latch body upper wall 46. The damper member 118 includes a base 124 shaped to fit the recess 122, and a viscous damper 128. The damper is, for example, a rotary damper, part number ACE-RD301, fabricated by Ace Controls Inc. of Farmington Hills, Mich., and contains silicone grease. Other dampers could be used so as to provide damping action as described further below. A lever 132 is mounted on a movable shaft 134 extending from the damper 128. As shall be described more clearly below, the lever 132 extends generally downwardly into a slot 138 in the upper wall 58 of the bolt member 22.

The bolt member abutments 66 are disposed against a pair of generally parallel springs 142a and 142b lodged in channels 144 terminating at the distal wall 42 of the latch body as further described below. A cover 146 covers the latch body 14. The cover 146, bolt member 22, springs 142, driver member 106 and pins 112 integral to the driver member 106 are fabricated, for example, of heat treated stainless steel having a strength of about 190,000 pounds per square inch. In other embodiments, other ballistic-impact-resistant materials could be used. The handle 86, escutcheon plate 88 and latch body 14 are fabricated, for example, of aluminum. The damper 128 and lever 132 are fabricated, for example, of plastic.

Figure 2:
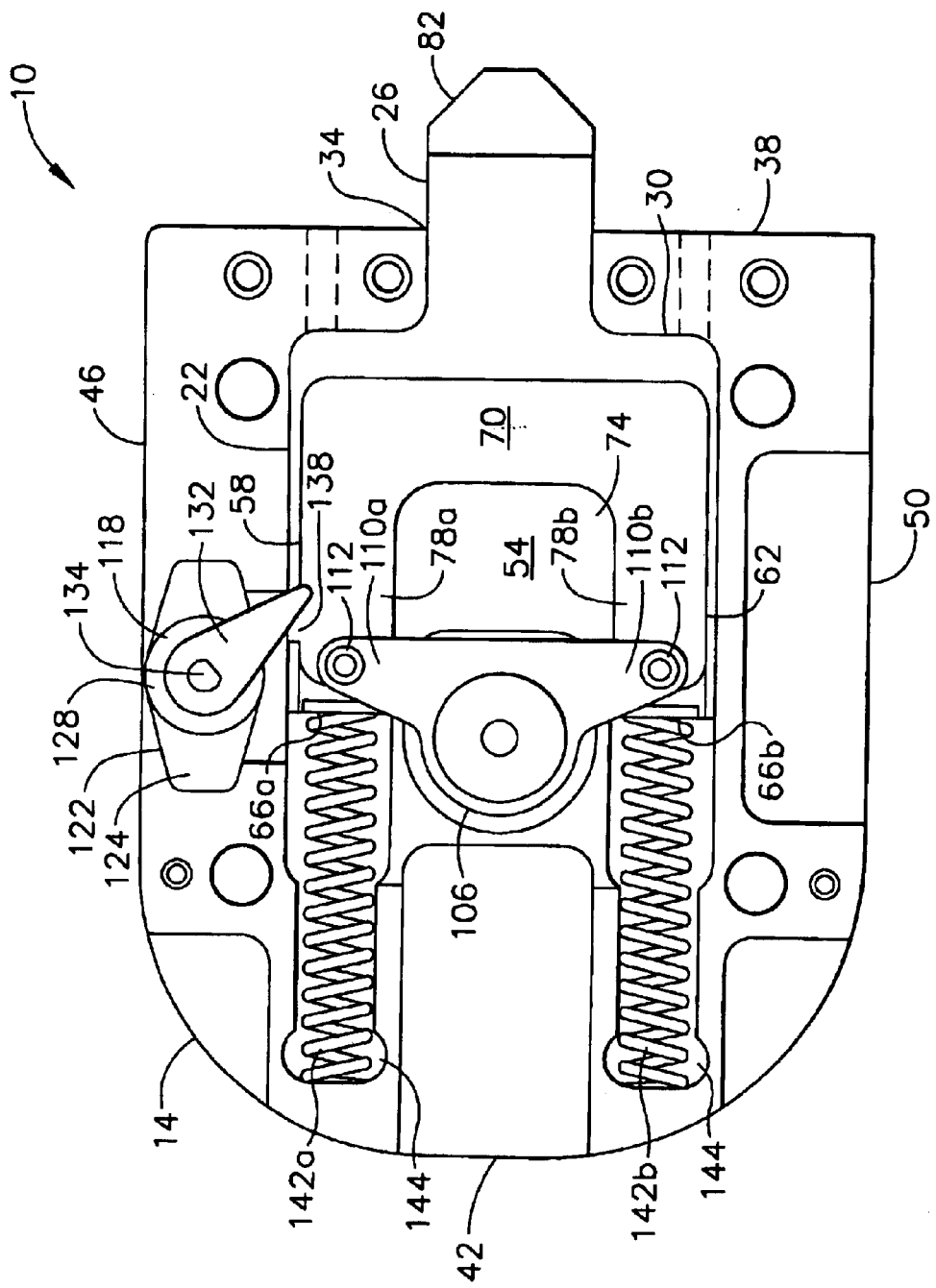
FIG. 2 is a cross-sectional view of the door latch shown in FIG. 1.

FIG. 2 is a cross sectional view of the latch 10 in a normal state, i.e. wherein the bolt 26 is extended relative to the latch body 14 and the door. The springs 142 are slightly compressed in the channels 144 so as to press the bolt member 22 against the proximal wall 38 of the latch body 14. The driver pins 112 rest upon the bolt member arms 78. The damper lever 132 extends through the slot 138 in the bolt member upper wall 58, generally in the direction of the bolt 26.

Figure 3:
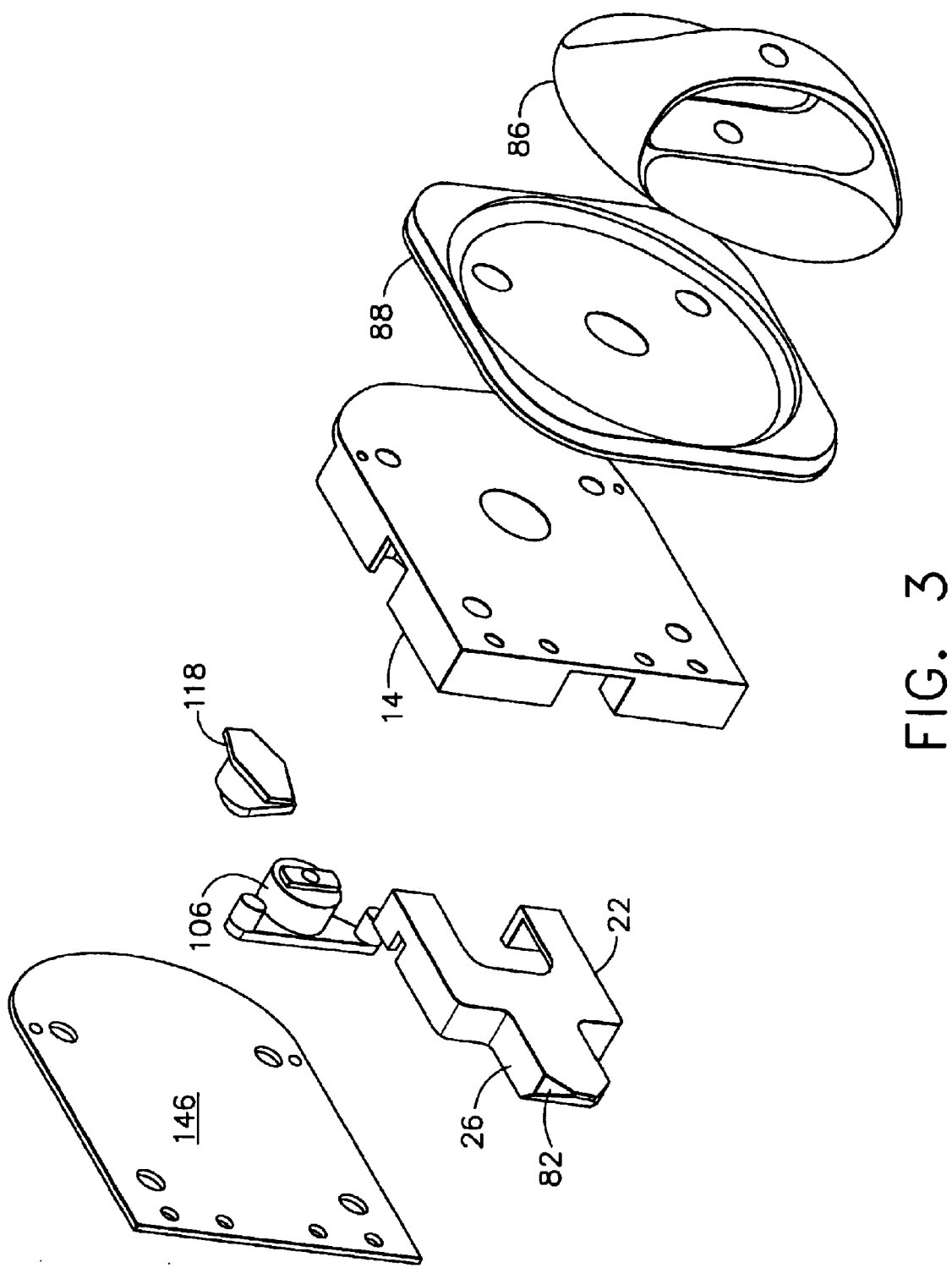
FIG. 3 is an exploded perspective of the latch shown in FIG. 1.
Figure 5:
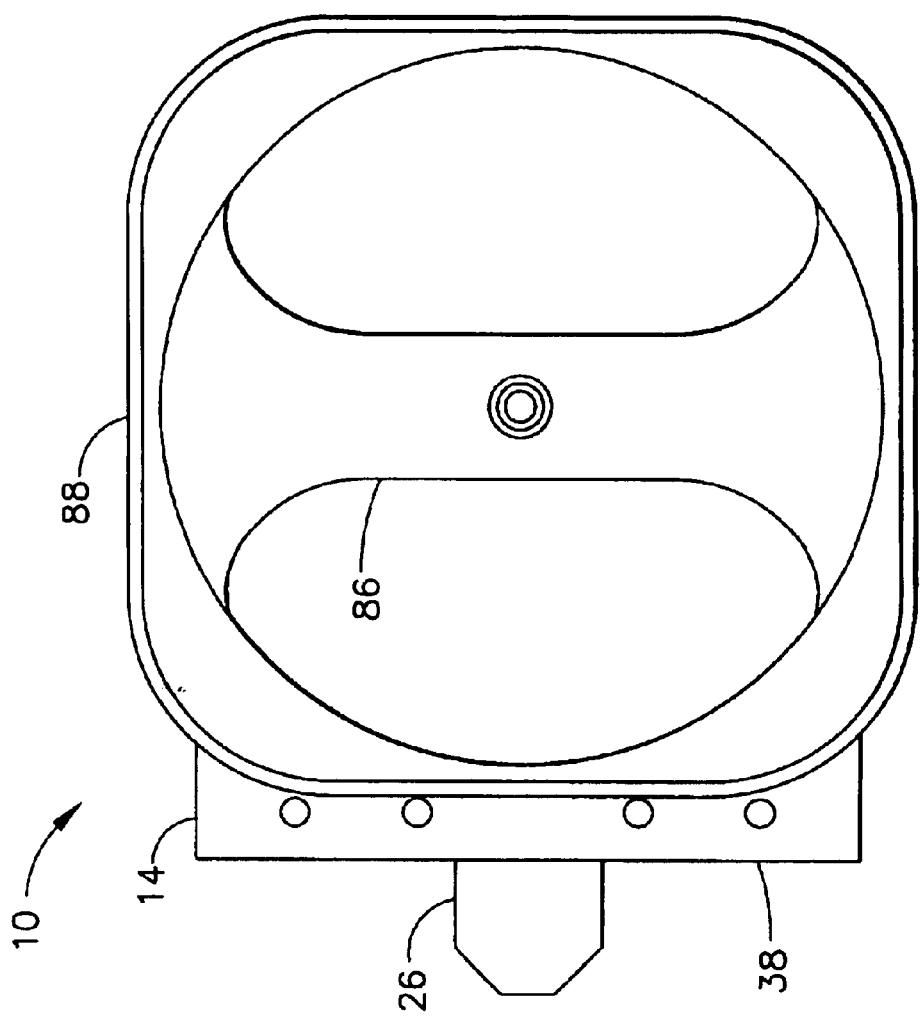
FIG. 5 is a frontal view of the latch shown in FIG. 1.
Figure 4:
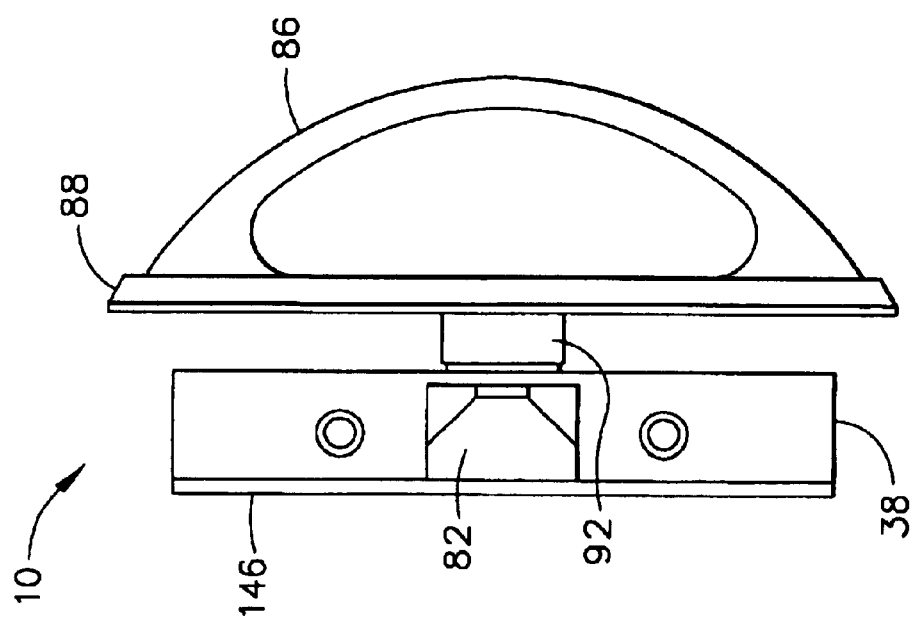
FIG. 4 is a longitudinal view of the latch shown in FIG. 1.

FIG. 3 is an exploded perspective view of the latch 10. FIG. 4 is a longitudinal view of the latch 10. FIG. 5 is a frontal view of the latch 10.

To close the door, a user preferably pushes the door to a closed position without turning the handle 86. The beveled tip 82 of the bolt thus is pressed, for example, against a strike plate (not shown) on the door frame, as known in the art. The door closes as the strike plate causes the bolt member 22 to compress the springs 142, and the bolt 26 retracts into the latch body 14. The damper lever 132 is pushed distally by the moving bolt member 22, and the damper 128 thus is activated to slow the movement of the lever 132 and the bolt member 22. As the bolt member 22 is pushed toward the springs 142, the urethane coating on the driver pins 112 tends to dampen noise generated by contact between the pins and the plate 70 as the plate 70 is shifted distally underneath the pins 112.

As the door is closed, the slot 34 comes into alignment with the bolt receptacle, e.g., an electrically powered strike. The springs 142 push the bolt 26 through the slot 34 into the receptacle as the springs return to their normal state. As the bolt member 26 is pushed by the springs, the damper 128, via the lever 132, retards the proximal movement of the bolt member 22. The urethane coating on the pins 112 tends to dampen noise generated by the bolt member arms 78 moving beneath the driver pins 112. The user alternatively can move the door to a closed position while turning the handle and moving the door in the desired direction. Turning the handle activates the driver member 106, as shall now be described.

To open the door, the user rotates the handle 86 in either a clockwise or counterclockwise direction while moving the door toward an open position. As the driver member 106 is rotated via the shaft 92, one of the driver arms 110 is pressed against a corresponding abutment 66. For example, as the driver member is rotated clockwise as shown in FIG. 2, the lower driver arm 110b is pushed against the lower abutment 66b. As the lower abutment is pushed, the springs 142 are compressed. As the bolt member 22 moves distally, the bolt 26 is retracted from the receptacle, and the door can be moved to an open position.

The two springs 142 provide a spring force that can be felt by a user while operating the latch 10. Should one of the springs 142 fail to operate in the intended manner such that the spring force is reduced, the difference in the spring force also can be felt by the user while operating the latch. Thus a need for repair can be determined before the latch 10 becomes inoperable.

Although the above described latch is ballistic-impact-resistant, it closes quietly, even when installed on a door representing a load as heavy as 2,000 pounds. As the door is closed, the damper retards the springing of the bolt member while the coating on the driver pins reduces noise. Thus the latch can be operated without unduly distracting the flight crew and without disturbing nearby sleeping passengers and/or resting crew members. Because the above latch can be retrofitted onto existing aircraft cockpit doors, costs of configuring aircraft to meet safety specifications can be reduced.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A door latch comprising:
   a latch body adapted for installation in a recess of a door;
   a bolt member spring-loaded in a hollow of the latch body and having a bolt extending through a slot in the latch body, the bolt member having a plate that is slotted to form a pair of opposed arms, each said arm configured to be further pressed against a spring against which it is spring-loaded, to retract the bolt through the latch body slot into a retracted position; and
   a damper mounted in the latch body and having a movable shaft and a lever extending from the shaft into a slot in one of the opposed arms in the bolt member;
   said damper, when activated, slowing the movement of the bolt member from the retracted position.

2. The latch of claim 1 wherein the damper comprises a viscous damper.

3. The latch of claim 1 wherein the damper comprises a rotary damper.

4. The latch of claim 1 further comprising a driver member movably mounted in the latch body and configured to be pressed against the bolt member to retract the bolt through the latch body slot.

5. The latch of claim 4 wherein the driver member comprises a pin configured to contact the bolt member, the pin further comprising a sound-dampening material.

6. The latch of claim 5 wherein the pin further comprises a ballistic-impact-resistant material.

7. The latch of claim 4 wherein the driver member comprises an arm configured to be pressed against the bolt member, the arm comprising a pin configured to contact the bolt member.

8. The latch of claim 7 wherein the pin comprises at least one of a urethane coating and a plastic coating.

9. A door latch comprising:
   a latch body adapted for installation in a recess of a door;
   a bolt member spring-loaded in a hollow of the latch body and having a bolt extending through a slot in the latch body, the bolt member having a pair of opposed arms, each said arm configured to be further pressed against a spring against which it is spring-loaded, to retract the bolt through the latch body slot into a retracted position;

a damper mounted in the latch body and having a shaft and a lever extending from the shaft into a slot in one of the opposed arms in the bolt member;

said damper, when activated, slowing the movement of the bolt member from the retracted position; and a driver member movably mounted in the latch body and configured to be pressed against at least one said arm of the bolt member to retract the bolt through the latch body slot;

wherein the driver member comprises a pin having a sound-dampening coating that contacts the bolt member.

10. The latch of claim 9 wherein the pin comprises at least one of a urethane coating and a plastic coating.

11. The latch of claim 9 wherein the damper is activated by movement of the bolt member.

12. The latch of claim 9 wherein the damper comprises a rotary viscous damper.

13. The latch of claim 9 wherein the driver member comprises a ballistic-impact-resistant material.

14. A door latch comprising:

a latch body adapted for installation in a recess of a door;

a bolt member spring-loaded in a hollow of the latch body and having a bolt extending through a slot in the latch body, the bolt member having a plate that is slotted to form a pair of opposed arms, each said arm configured to be further pressed against a spring against which it is spring-loaded, to retract the bolt through the latch body slot into a retracted position;

a damper mounted in the latch body and having a shaft and a lever extending from the shaft into a slot in one of the pair of opposed arms in the bolt member;

said damper, when activated, slowing the movement of the bolt member from the retracted position; and a driver member movably mounted in the latch body and configured to be pressed against the bolt member to retract the bolt through the latch body slot;

wherein the driver member comprises a pin that contacts the bolt member and is coated with a sound-dampening material.

15. A method for latching a door comprising the steps of:

installing a latch body in a recess of the door, the latch body having a hollow in which a bolt member is spring-loaded, the bolt member having a bolt extending through a slot in the latch body, the bolt member having a plate that is slotted to form a pair of opposed arms, each said arm configured to be further pressed against a spring against which it is spring loaded, to retract the bolt into the latch body;

moving the door to cause the bolt member to be further pressed against a spring such that the bolt is retracted into the latch body into a retracted position; and said damper having a lever extending into one of the arms of the bolt member for slowing movement of the bolt member from the retracted position, said damper being mounted in the latch body.

16. The method of claim 15 wherein the slowing step comprises the step of moving the lever to activate the damper.

17. The method of claim 16 further comprising the step of dampening noise generated by contact between a driver pin and the bolt member, said step performed using a coating on the pin.

* * * * *